(12) United States Patent
Baxter et al.

(10) Patent No.: US 10,293,297 B2
(45) Date of Patent: May 21, 2019

(54) METHOD FOR REMOVAL OF A FOULANT FROM A CARRIER GAS IN A SINGLE VESSEL USING CRYOGENIC LIQUIDS

(71) Applicants: Larry Baxter, Orem, UT (US); Kyler Stitt, Lindon, UT (US); Christopher Hoeger, Provo, UT (US); Aaron Sayre, Spanish Fork, UT (US); Eric Mansfield, Spanish Fork, UT (US); Nathan Davis, Bountiful, UT (US)

(72) Inventors: Larry Baxter, Orem, UT (US); Kyler Stitt, Lindon, UT (US); Christopher Hoeger, Provo, UT (US); Aaron Sayre, Spanish Fork, UT (US); Eric Mansfield, Spanish Fork, UT (US); Nathan Davis, Bountiful, UT (US)

(73) Assignee: Sustainable Energy Solutions, LLC, Orem, UT (US)

( * ) Notice: Subject to any disclaimer, the term of this patent is extended or adjusted under 35 U.S.C. 154(b) by 281 days.

(21) Appl. No.: 15/472,542

(22) Filed: Mar. 29, 2017

(65) Prior Publication Data
US 2018/0283781 A1    Oct. 4, 2018

(51) Int. Cl.
*B01D 3/00*     (2006.01)
*B01D 53/00*    (2006.01)

(52) U.S. Cl.
CPC .................................. *B01D 53/002* (2013.01)

(58) Field of Classification Search
CPC ........... F25J 3/08; B01F 7/081; B01D 53/002; B01D 5/0024; B01D 7/00; C10L 3/101
See application file for complete search history.

(56) References Cited

U.S. PATENT DOCUMENTS

2007/0220850 A1* 9/2007 Thompson ........... B01D 53/002
                                                         55/457
2013/0152628 A1* 6/2013 Find ........................ B01D 1/28
                                                         62/620

\* cited by examiner

*Primary Examiner* — Emmanuel E Duke (57) ABSTRACT

A method for removal of a foulant from a carrier gas is disclosed. A solids conveyance device that spans a vessel is provided, comprising an enclosed section and a filtering section. A cryogenic liquid and the carrier gas are provided to the enclosed section. The foulant condenses, dissolves, or desublimates into the cryogenic liquid, forming a cryogenic slurry and a foulant-depleted carrier gas entrained in the cryogenic slurry. The solids conveyance device advances the cryogenic slurry into the filtering section. The foulant-depleted carrier gas leaves the vessel through an upper portion of the permeable exterior wall and a warmed cryogenic liquid is removed from the cryogenic slurry through a lower portion of the permeable exterior wall, resulting in a solid foulant that is passed out of the solids outlet. In this manner, the foulant is removed from the carrier gas.

20 Claims, 7 Drawing Sheets

701
Provide an auger in a vessel with an enclosed and a filter section

702
Provide a cryogenic liquid and a carrier gas to the enclosed section to condense, dissolve or desublimate a foulant and make a cryogenic slurry.

703
Provide the cryogenic slurry to the filter section, separating a foulant-depleted carrier gas, a warmed cryogenic liquid, and a solid foulant.

704
Provide a pulse of pressurized gas to the permeable exterior wall to remove solids buildup in the openings of the wall.

FIG. 7

METHOD FOR REMOVAL OF A FOULANT FROM A CARRIER GAS IN A SINGLE VESSEL USING CRYOGENIC LIQUIDS

This invention was made with government support under DE-FE0028697 awarded by The Department of Energy. The government has certain rights in the invention.

FIELD OF THE INVENTION

This invention relates generally to the field of cryogenic removal of foulants from a carrier gas.

BACKGROUND

The art of cryogenic capture of foulants from carrier gases is relatively young. The ability to capture foulants, like acid gases, is of great importance to environmentally sound industrial progress. However, existing capture technologies are extremely complex, requiring many unit operations to capture and purify acid gases, such as carbon dioxide. The ability to make a cryogenic capture process that minimizes unit operations, and therefore minimizes energy and financial costs, is required.

United States patent publication number 20120125043 by Cullinane teaches a cryogenic system for removing acid gases from a hydrocarbon gas stream. The system utilizes a cryogenic distillation tower to collect the acid gases as solids. The present disclosure differs from this disclosure in that this disclosure utilizes a distillation tower and associated heat exchangers, while the present disclosure does not require the complex distillation systems. This disclosure is pertinent and may benefit from the methods disclosed herein and is hereby incorporated for reference in its entirety for all that it teaches.

WIPO patent publication number 2003062725 by Amin et al. teaches a process and device for production of LNG by removal of freezable solids. The process involves freezing any freezable species out of the natural gas feed stream during pressurization to produce LNG using a vortex induced by stirring, allowing for separation of the solids from the LNG slurry. The present disclosure differs from this disclosure in that this disclosure focuses on preventing solids from sticking to the walls by stirring the slurry rapidly, not utilizing an auger to keep solids moving and prevent them from sticking to the wall. Further, the separation step requires additional solid-liquid separation equipment, while the present disclosure accomplishes both solids removal from the gas and solids separation from the liquid in one piece of equipment. This disclosure is pertinent and may benefit from the methods disclosed herein and is hereby incorporated for reference in its entirety for all that it teaches.

SUMMARY

A method for removal of a foulant from a carrier gas is disclosed. A solids conveyance device that spans a vessel is provided. The vessel comprises an enclosed section and a filtering section. The enclosed section feeds the filtering section, has a non-permeable exterior wall, and comprises a liquid inlet and a gas inlet. The filter section is fed by the enclosed section, has a permeable exterior wall, and a solids outlet. A cryogenic liquid is provided to the liquid inlet of the enclosed section. The carrier gas containing the foulant is provided to the gas inlet of the enclosed section. The foulant condenses, dissolves, or desublimates into the cryogenic liquid, forming a cryogenic slurry and a foulant-depleted carrier gas entrained in the cryogenic slurry. The solids conveyance device advances the cryogenic slurry into the filtering section. A warmed cryogenic liquid is removed from the cryogenic slurry through a portion of the permeable exterior wall. The foulant-depleted carrier gas is removed from the vessel through a path comprising a portion of the permeable exterior wall, the solids outlet, or a combination thereof. A solid foulant is passed out of the solids outlet. In this manner, the foulant is removed from the carrier gas.

The vessel may comprise aluminum, stainless steel, polymers, ceramics, or combinations thereof.

The foulant may comprise carbon dioxide, nitrogen oxide, sulfur dioxide, nitrogen dioxide, sulfur trioxide, hydrogen sulfide, hydrogen cyanide, water, hydrocarbons with a freezing point below the temperature at which the cryogenic liquid becomes a solid, or combinations thereof. The carrier gas may comprise combustion flue gas, syngas, producer gas, natural gas, steam reforming gas, any hydrocarbon that has higher volatility the foulant, light gases, or combinations thereof. The cryogenic liquid may comprise any compound or mixture of compounds with a freezing point below a temperature at which the foulant becomes a solid.

A cryogenic gas may be provided to the gas inlet with the carrier gas, further cooling the cryogenic liquid.

Any surface of the vessel or the solid conveyance device exposed to the cryogenic liquid may comprise ceramics, polytetrafluoroethylene, polychlorotrifluoroethylene, natural diamond, man-made diamond, chemical-vapor deposition diamond, polycrystalline diamond, or combinations thereof.

The solids conveyance device may comprise an auger. The auger and the vessel may be oriented at an angle comprising angles between 0 and 90 degrees versus horizontal.

The solids outlet may comprise a restriction that provides a back pressure to the vessel.

The solid foulant may comprise solid particles of between 25 microns and 100 microns effective diameter. The cryogenic liquid and carrier gas may be provided to the vessel at a pressure to cause the solid foulant to compress and fuse into particles of at least 1 mm effective diameter at the solids outlet.

The solid foulant may be provided to a melting device that produces a final product comprising a liquid foulant. When the foulant comprises carbon dioxide, the melting device may be operated at a pressure above a pressure at which liquid carbon dioxide can exist.

The solid foulant may be warmed as a portion of a refrigeration process to—produce the cryogenic liquid.

A portion of the cryogenic liquid may be entrained in the solid foulant and the cryogenic liquid may be removed by a solid-liquid separation process. The solid-liquid separation process may comprise a screw press, a filter-press, or a combination thereof.

The permeable exterior wall may comprise openings of less than 25 microns. Any surface of the permeable exterior wall exposed to cryogenic liquid may comprise ceramics, polytetrafluoroethylene, polychlorotrifluoroethylene, natural diamond, man-made diamond, chemical-vapor deposition diamond, polycrystalline diamond, or combinations thereof.

The permeable exterior wall may be provided with a means of removing a solid buildup through an opening or openings in the permeable exterior wall, the means comprising a pulse of pressurized gas into the vessel through the opening or openings.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1:
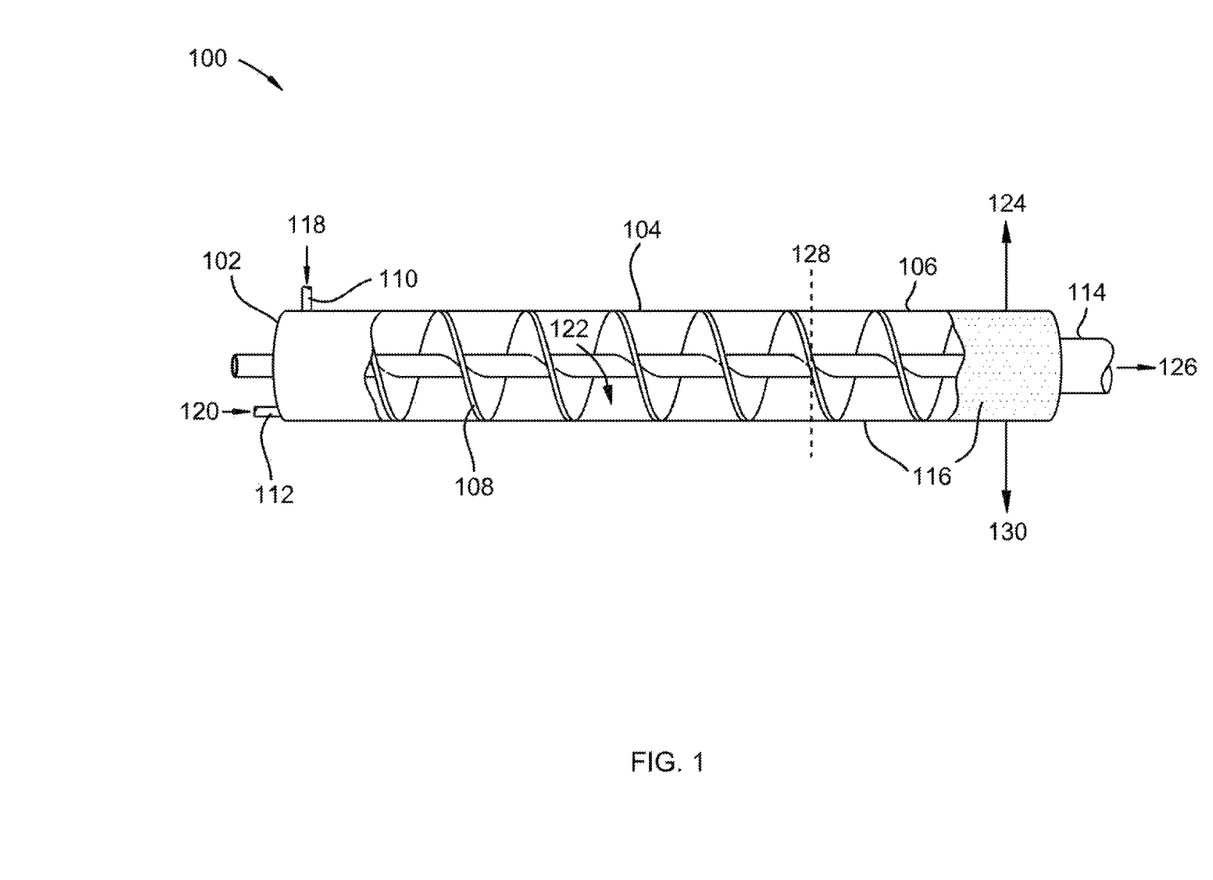
FIG. 1 shows an isometric cross-sectional view of a horizontally aligned vessel for use in removal of a foulant from a carrier gas.

Referring to FIG. 1, an isometric cross-sectional view of a horizontally aligned vessel for use in removal of a foulant from a carrier gas is shown at 100, as per one embodiment of the present invention. Vessel 102 comprises enclosed section 104, filtering section 106, auger 108, liquid inlet 110, gas inlet 112, and solids outlet 114. Enclosed section 104 and filtering section 106 are distinguished on FIG. 1 by dashed line 128 through vessel 102. Filtering section 106 has permeable exterior walls 116. Cryogenic liquid 118 is provided to liquid inlet 110. Carrier gas 120, containing a foulant, is provided to gas inlet 112. The foulant condenses, dissolves, or desublimates into cryogenic liquid 118, forming cryogenic slurry 122 and foulant-depleted carrier gas 124. Auger 108 advances cryogenic slurry 122 and foulant-depleted carrier gas 124 from enclosed section 104 to filtering section 106. Foulant-depleted carrier gas 124 leaves vessel 102 by passing through a top portion of permeable exterior walls 116. Warmed cryogenic liquid 130 leaves vessel 102 through a bottom portion of permeable exterior walls 116, resulting in solid foulant 126, which leaves vessel 102 through solids outlet 114. In this manner, the foulant is removed from carrier gas 120.

Figure 2:
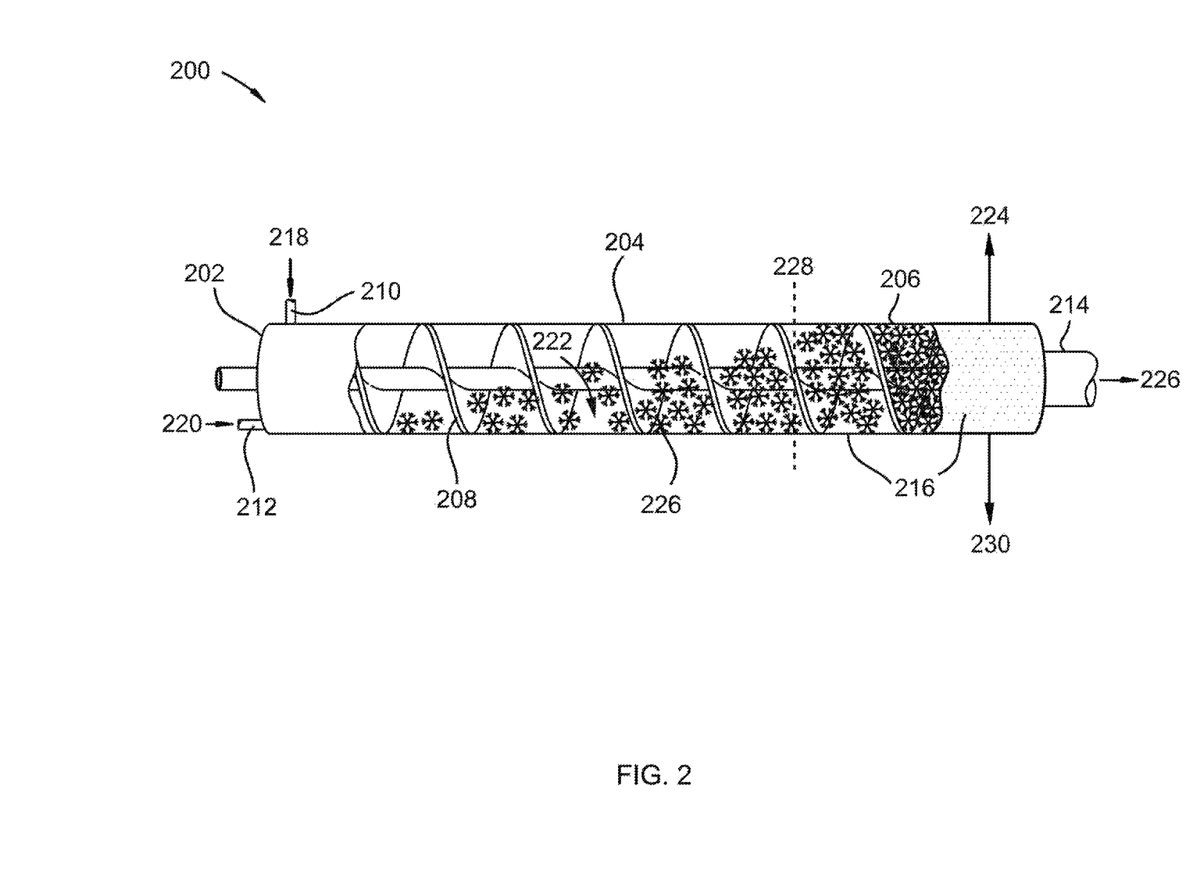
FIG. 2 shows an isometric cross-sectional view of a horizontally aligned vessel for use in removal of a foulant from a carrier gas.

Referring to FIG. 2, an isometric cross-sectional view of a horizontally aligned vessel for use in removal of a foulant from a flue gas is shown at 200, as per one embodiment of the present invention. Vessel 202 comprises enclosed section 204, filtering section 206, auger 208, liquid inlet 210, gas inlet 212, and solids outlet 214. Enclosed section 204 and filtering section 206 are distinguished on FIG. 2 by dashed line 228 through vessel 202. Filtering section 206 has permeable exterior walls 216 with holes no larger than an effective diameter of 25 microns. Isopentane 218 is provided to liquid inlet 210. Flue gas 220, containing carbon dioxide, is provided to gas inlet 212. The carbon dioxide desublimates into isopentane 218, forming cryogenic slurry 222 and carbon dioxide-depleted flue gas 224. Auger 208 advances cryogenic slurry 222 and carbon dioxide-depleted flue gas 224 from enclosed section 204 to filtering section 206. Carbon dioxide-depleted flue gas 224 leaves vessel 202 by passing through a top portion of permeable exterior walls 216. Warmed isopentane 230 leaves vessel 202 through a bottom portion of permeable exterior walls 216, leaving carbon dioxide solid 226, which leaves vessel 202 through solids outlet 214. In this manner, the carbon dioxide is removed from flue gas 220.

Figure 3:
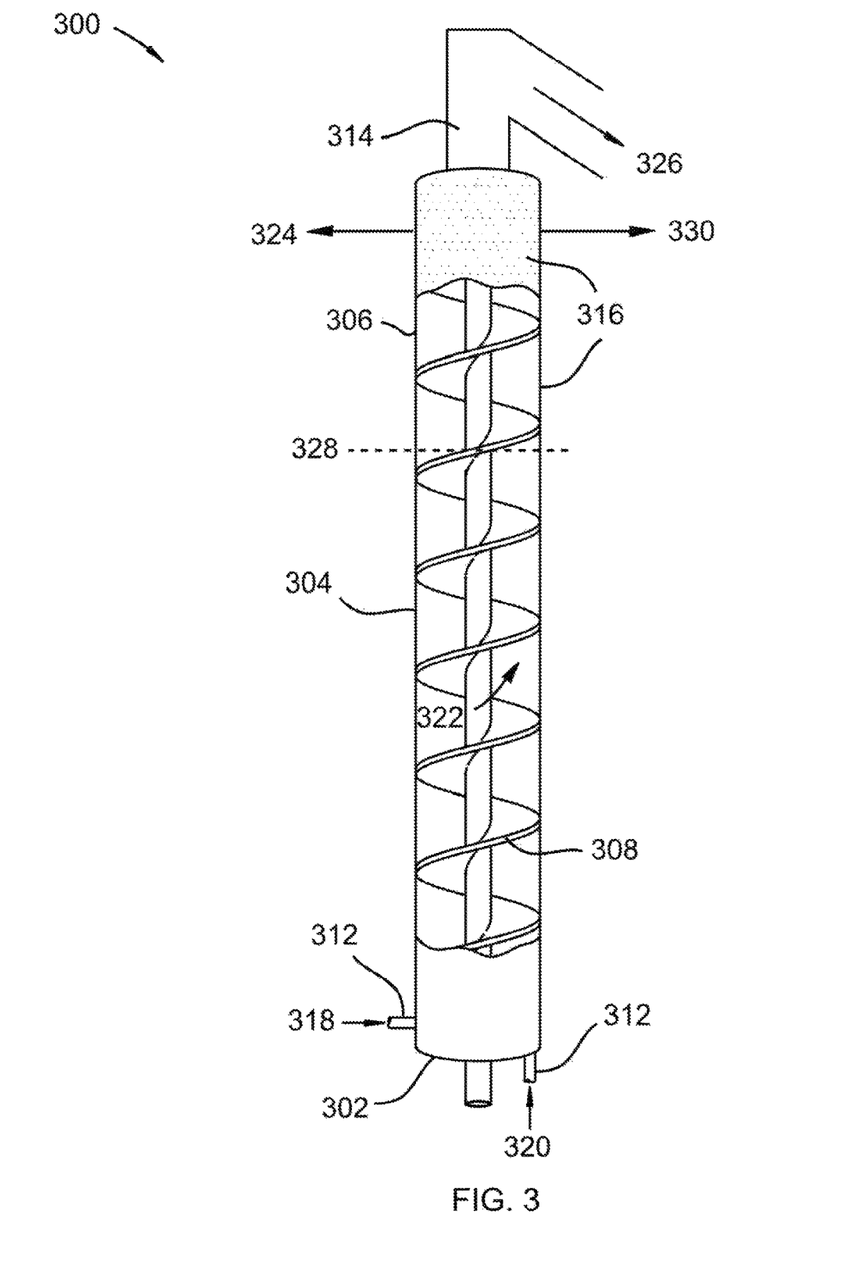
FIG. 3 shows an isometric cross-sectional view of a vertically aligned vessel for use in removal of a foulant from a carrier gas.

Referring to FIG. 3, an isometric cross-sectional view of a vertically aligned vessel for use in removal of a foulant from a carrier gas is shown at 300, as per one embodiment of the present invention. Vessel 302 comprises enclosed section 304, filtering section 306, auger 308, liquid inlet 310, gas inlet 312, and solids outlet chute 314. Enclosed section 304 and filtering section 306 are distinguished on FIG. 3 by dashed line 328 through vessel 302. Filtering section 306 has permeable exterior walls 316. Cryogenic liquid 318 is provided to liquid inlet 310. Carrier gas 320, containing a foulant, is provided to gas inlet 312. The foulant condenses, dissolves, or desublimates into cryogenic liquid 318, forming cryogenic slurry 322 and foulant-depleted carrier gas 324. Auger 308 advances cryogenic slurry 322 and foulant-depleted carrier gas 324 from enclosed section 304 to filtering section 306. Warmed cryogenic liquid 330 leaves vessel 302 through a portion of permeable exterior walls 316, resulting in solid foulant 326. Solid foulant 326 leaves vessel 302 through solids outlet chute 314. Foulant-depleted carrier gas 324 leaves vessel 302 through a portion of permeable exterior walls 316 and through solids outlet chute 314. In this manner, the foulant is removed from carrier gas 320.

Figure 4:
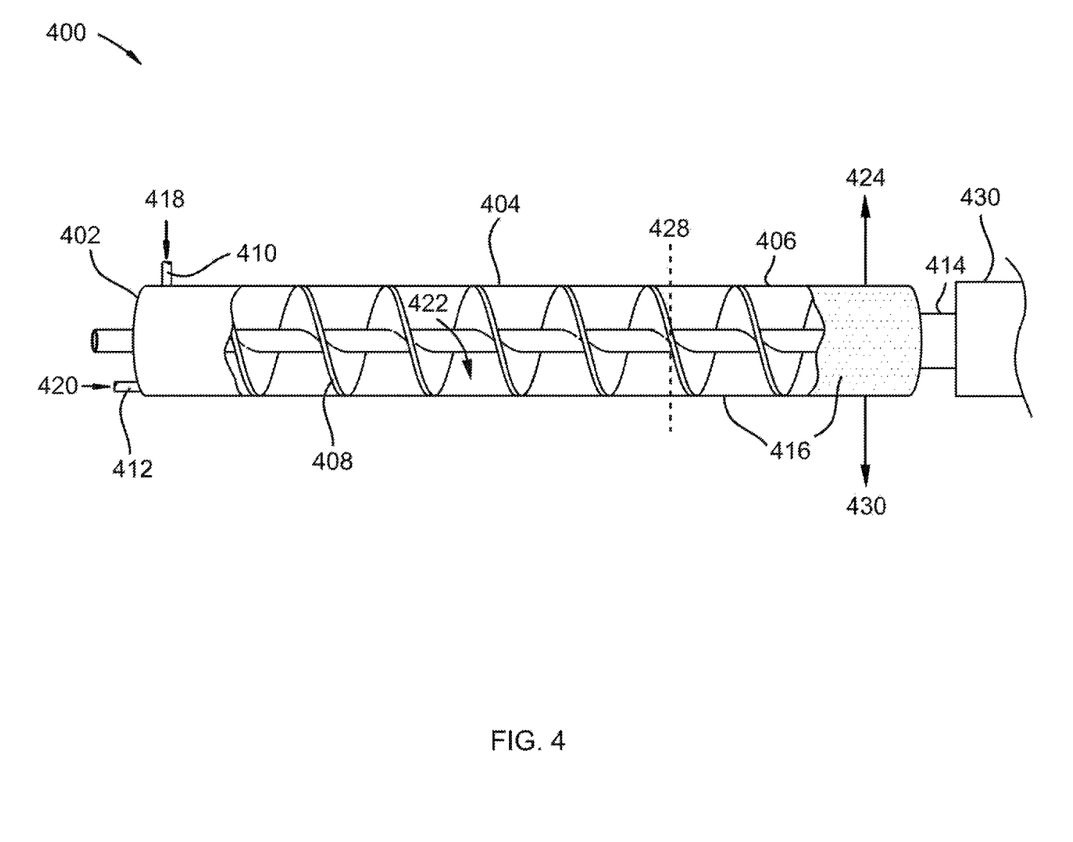
FIG. 4 shows an isometric cross-sectional view of a horizontally aligned vessel for use in removal of a foulant from a carrier gas.

Referring to FIG. 4, an isometric cross-sectional view of a horizontally aligned vessel for use in removal of a foulant from a carrier gas is shown at 400, as per one embodiment of the present invention. Vessel 402 comprises enclosed section 404, filtering section 406, auger 408, liquid inlet 410, gas inlet 412, and solids outlet 414. Melter 430 is attached to solids outlet 414. Enclosed section 404 and filtering section 406 are distinguished on FIG. 4 by dashed line 428 through vessel 402. Filtering section 406 has permeable exterior walls 416. Cryogenic liquid 418 is provided to liquid inlet 410. Carrier gas 420, containing a foulant, is provided to gas inlet 412. The foulant condenses, dissolves, or desublimates into cryogenic liquid 418, forming cryogenic slurry 422 and foulant-depleted carrier gas 424. Auger 408 advances cryogenic slurry 422 and foulant-depleted carrier gas 424 from enclosed section 104 to filtering section 406. Foulant-depleted carrier gas 424 leaves vessel 402 by passing through a top portion of permeable exterior walls 416. Warmed cryogenic liquid 430 leaves vessel 402 through a bottom portion of permeable exterior walls 416, resulting in solid foulant 426, which leaves vessel 402 through solids outlet 414. Solid foulant 426 is provided to melter 430, producing a liquid foulant. In this manner, the foulant is removed from carrier gas 420.

Figure 5:
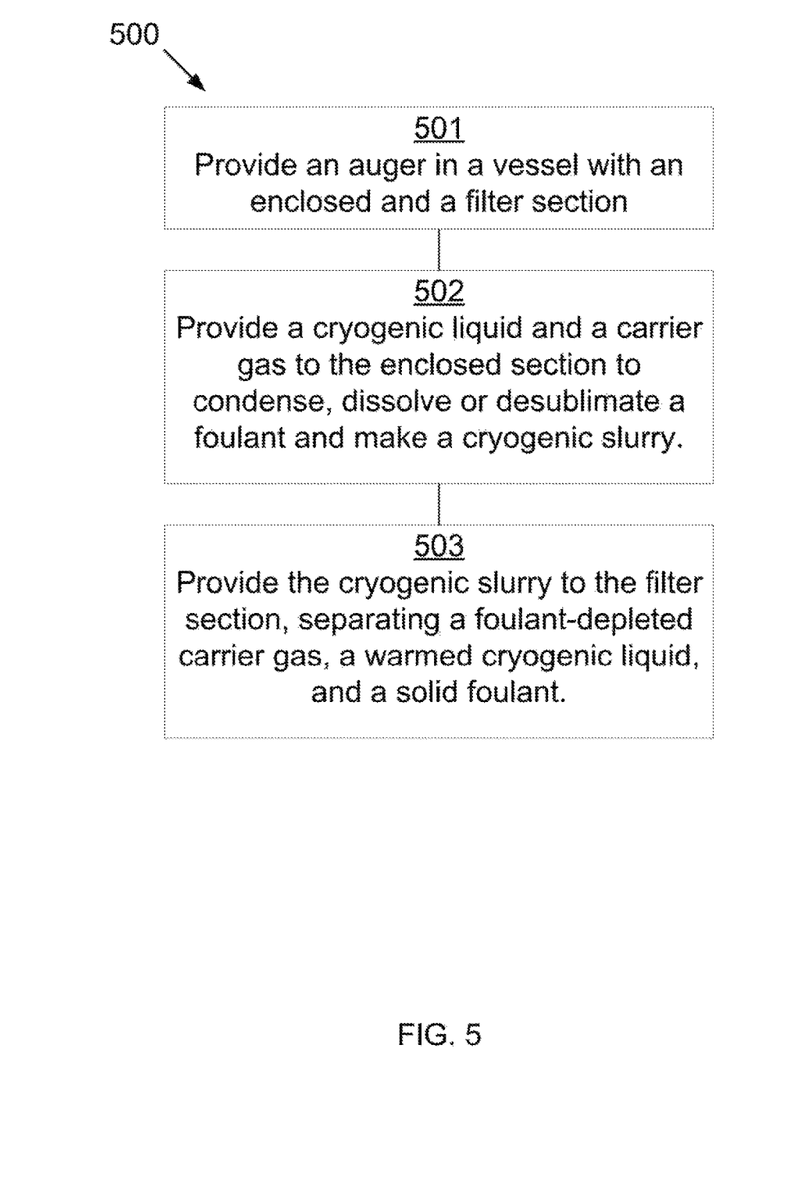
FIG. 5 shows a method for removing a foulant from a carrier gas.

Referring to FIG. 5, a method for removing a foulant from a carrier gas is shown at 500, as per one embodiment of the present invention. An auger in a vessel comprising an enclosed section and a filtering section is provided 501. A cryogenic liquid and a carrier gas are fed into the enclosed section where the foulant condenses, dissolves, or desublimates into the cryogenic liquid to form a cryogenic slurry 502. The cryogenic slurry is passed to the filter section where a warmed cryogenic slurry and a foulant-depleted carrier gas are removed, producing a solid foulant that is removed 503.

Referring to FIG. 5, a method for removing a foulant from a carrier gas is shown at 500, as per one embodiment of the present invention. An auger in a vessel comprising an enclosed section and a filtering section is provided 501. A cryogenic liquid and a carrier gas are fed into the enclosed section where the foulant condenses, dissolves, or desublimates into the cryogenic liquid to form a cryogenic slurry 502. The cryogenic slurry is passed to the filter section where a warmed cryogenic slurry and a foulant-depleted carrier gas are removed, producing a solid foulant that is removed 503.

Figure 6:
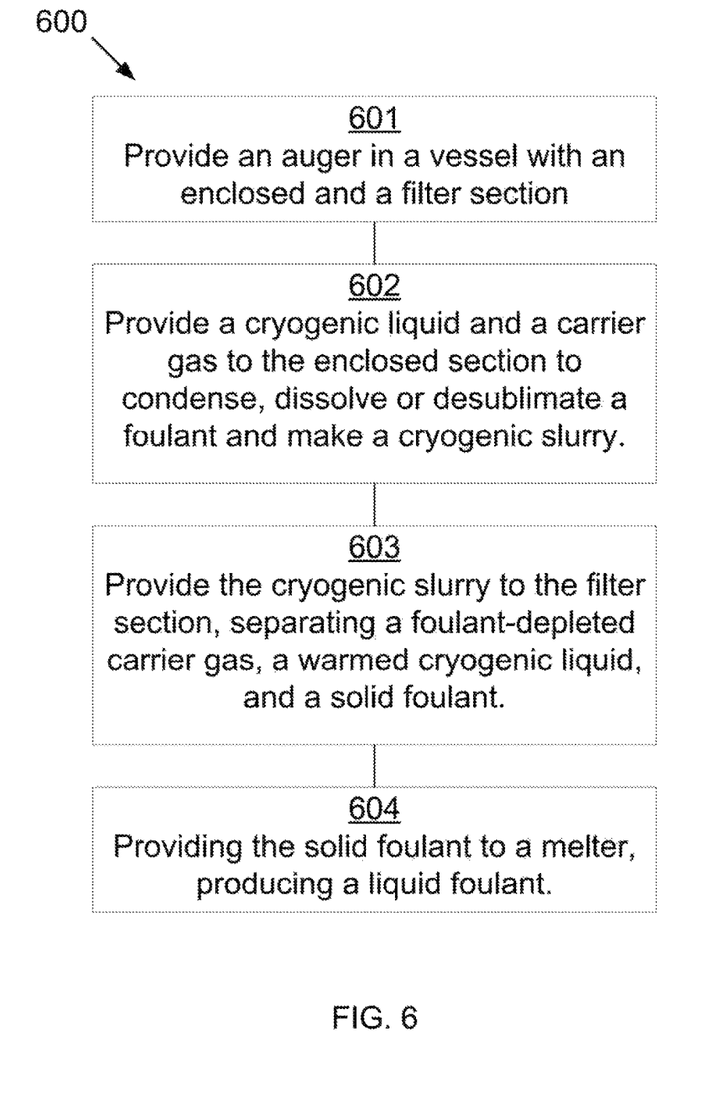
FIG. 6 shows a method for removing a foulant from a carrier gas.

Referring to FIG. 6, a method for removing a foulant from a carrier gas is shown at 600, as per one embodiment of the present invention. An auger in a vessel comprising an enclosed section and a filtering section is provided 601. A cryogenic liquid and a carrier gas are fed into the enclosed section where the foulant condenses, dissolves, or desublimates into the cryogenic liquid to form a cryogenic slurry 602. The cryogenic slurry is passed to the filter section where a warmed cryogenic slurry and a foulant-depleted carrier gas are removed, producing a solid foulant that is removed 603. The solid foulant is provided to a melter, which produces a liquid foulant 604.

Figure 7:
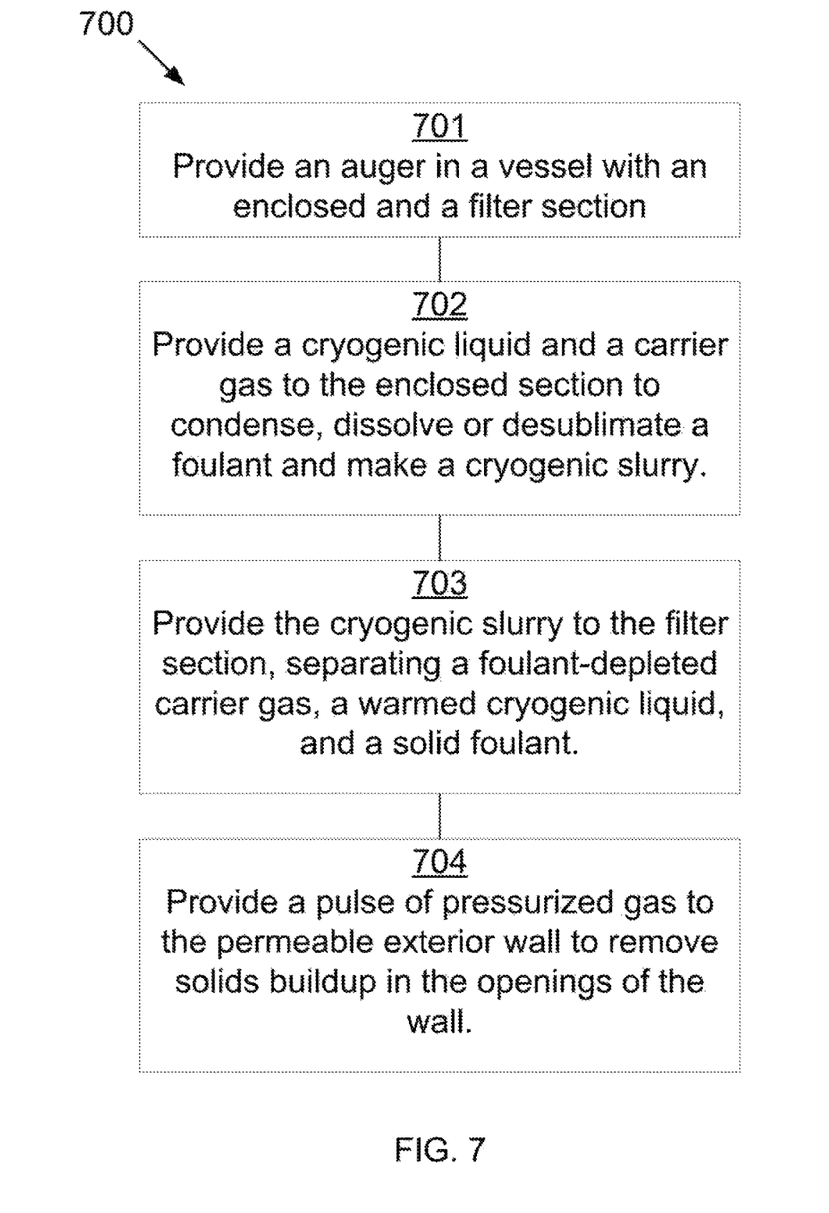
FIG. 7 shows a method for removing a foulant from a carrier gas.

Referring to FIG. 7, a method for removing a foulant from a carrier gas is shown at 700, as per one embodiment of the present invention. An auger in a vessel comprising an enclosed section and a filtering section is provided 701. A cryogenic liquid and a carrier gas are fed into the enclosed section where the foulant condenses, dissolves, or desublimates into the cryogenic liquid to form a cryogenic slurry 702. The cryogenic slurry is passed to the filter section where a warmed cryogenic slurry and a foulant-depleted carrier gas are removed, producing a solid foulant that is removed 703. Solids foulant build-up is removed by providing a pulse of pressurized gas through the permeable exterior wall into the vessel, removing buildup in any openings of the permeable exterior wall 704.

In some embodiments, the vessel comprises aluminum, stainless steel, polymers, ceramics, or combinations thereof.

In some embodiments, the foulant comprises carbon dioxide, nitrogen oxide, sulfur dioxide, nitrogen dioxide, sulfur trioxide, hydrogen sulfide, hydrogen cyanide, water, hydrocarbons with a freezing point below the temperature at which the cryogenic liquid becomes a solid, or combinations thereof. In some embodiments, the carrier gas comprises combustion flue gas, syngas, producer gas, natural gas, steam reforming gas, any hydrocarbon that has higher volatility the foulant, light gases, or combinations thereof. In some embodiments, the cryogenic liquid comprises any compound or mixture of compounds with a freezing point below a temperature at which the foulant becomes a solid.

In some embodiments, a cryogenic gas is provided to the gas inlet with the carrier gas, further cooling the cryogenic liquid.

In some embodiments, any surface of the vessel exposed to the cryogenic liquid comprises ceramics, polytetrafluoroethylene, polychlorotrifluoroethylene, natural diamond, man-made diamond, chemical-vapor deposition diamond, polycrystalline diamond, or combinations thereof. In some embodiments, any surface of the solid conveyance device exposed to the cryogenic liquid comprises ceramics, polytetrafluoroethylene, polychlorotrifluoroethylene, natural diamond, man-made diamond, chemical-vapor deposition diamond, polycrystalline diamond, or combinations thereof.

In some embodiments, the solids conveyance device comprises an auger. In some embodiments, the auger and the vessel are oriented at an angle comprising angles between 0 and 90 degrees versus horizontal.

In some embodiments, the solids outlet comprises a restriction that provides a back pressure to the vessel.

In some embodiments, the solid foulant comprises solid particles of between 25 microns and 100 microns effective diameter, and wherein the cryogenic liquid and carrier gas are provided to the vessel at a pressure to cause the solid foulant to compress and fuse into particles of at least 1 mm effective diameter at the solids outlet.

In some embodiments, the solid foulant is provided to a melting device that produces a final product comprising a liquid foulant. In some embodiments, the foulant comprises carbon dioxide and the melting device is operated at a pressure above a pressure at which liquid carbon dioxide can exist.

In some embodiments, the solid foulant is warmed as a portion of a refrigeration process to produce the cryogenic liquid.

In some embodiments, a portion of the cryogenic liquid is entrained in the solid foulant and the cryogenic liquid is removed by a solid-liquid separation process. In some embodiments, the solid-liquid separation process comprises a screw press, a filter-press, or a combination thereof.

In some embodiments, the permeable exterior wall comprises openings of less than 25 microns. In some embodiments, any surface of the permeable exterior wall exposed to cryogenic liquid comprises ceramics, polytetrafluoroethylene, polychlorotrifluoroethylene, natural diamond, man-made diamond, chemical-vapor deposition diamond, polycrystalline diamond, or combinations thereof.

Th In some embodiments, the permeable exterior wall is provided with a means of removing a solid buildup through an opening or openings in the permeable exterior wall, the means comprising a pulse of pressurized gas into the vessel through the opening or openings.

Combustion flue gas consists of the exhaust gas from a fireplace, oven, furnace, boiler, steam generator, or other combustor. The combustion fuel sources include coal, hydrocarbons, and biomass. Combustion flue gas varies greatly in composition depending on the method of combustion and the source of fuel. Combustion in pure oxygen produces little to no nitrogen in the flue gas. Combustion using air leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The method disclosed applies to any combustion flue gases.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than water, including hydrogen, helium, carbon dioxide, nitrogen, and oxygen. This list is for example only and should not be implied to constitute a limitation as to the viability of other gases in the process. A person of skill in the art would be able to evaluate any gas as to whether it has higher volatility than water.

The invention claimed is:

1. A method for removal of a foulant from a carrier gas, the method comprising:
    providing a solids conveyance device that spans a vessel, the vessel comprising an enclosed section and a filtering section, wherein:
        the enclosed section feeds the filtering section, has a non-permeable exterior wall, and comprises a liquid inlet and a gas inlet; and,
        the filter section is fed by the enclosed section, has a permeable exterior wall, and a solids outlet;
    providing a cryogenic liquid to the liquid inlet of the enclosed section;
    providing the carrier gas containing the foulant to the gas inlet of the enclosed section, wherein the foulant condenses, dissolves, or desublimates into the cryogenic liquid, forming a cryogenic slurry and a foulant-depleted carrier gas entrained in the cryogenic slurry; and,
    causing the solids conveyance device to advance the cryogenic slurry into the filtering section, wherein a warmed cryogenic liquid is removed from the cryogenic slurry through a portion of the permeable exterior wall, the foulant-depleted carrier gas is removed from the vessel through a path comprising a portion of the permeable exterior wall, the solids outlet, or a combination thereof, and a solid foulant is passed out of the solids outlet;
    whereby the foulant is removed from the carrier gas.

2. The method of claim 1, wherein the vessel comprises aluminum, stainless steel, polymers, ceramics, or combinations thereof.

3. The method of claim 1, wherein the foulant comprises carbon dioxide, nitrogen oxide, sulfur dioxide, nitrogen dioxide, sulfur trioxide, hydrogen sulfide, hydrogen cyanide, water, hydrocarbons with a freezing point below the temperature at which the cryogenic liquid becomes a solid, or combinations thereof.

4. The method of claim 1, wherein the carrier gas comprises combustion flue gas, syngas, producer gas, natural gas, steam reforming gas, any hydrocarbon that has higher volatility the foulant, light gases, or combinations thereof.

5. The method of claim 1, wherein the cryogenic liquid comprises any compound or mixture of compounds with a freezing point below a temperature at which the foulant becomes a solid.

6. The method of claim 1, wherein a cryogenic gas is provided to the gas inlet with the carrier gas, further cooling the cryogenic liquid.

7. The method of claim 1, wherein any surface of the vessel exposed to the cryogenic liquid comprises ceramics, polytetrafluoroethylene, polychlorotrifluoroethylene, natural diamond, man-made diamond, chemical-vapor deposition diamond, polycrystalline diamond, or combinations thereof.

8. The method of claim 1, wherein any surface of the solid conveyance device exposed to the cryogenic liquid comprises ceramics, polytetrafluoroethylene, polychlorotrifluoroethylene, natural diamond, man-made diamond, chemical-vapor deposition diamond, polycrystalline diamond, or combinations thereof.

9. The method of claim 1, wherein the solids conveyance device comprises an auger.

10. The method of claim 9, wherein the auger and the vessel are oriented at an angle comprising angles between 0 and 90 degrees versus horizontal.

11. The method of claim 9, wherein the solids outlet comprises a restriction that provides a back pressure to the vessel.

12. The method of claim 1, wherein the solid foulant comprises solid particles of between 25 microns and 100 microns effective diameter, and wherein the cryogenic liquid and carrier gas are provided to the vessel at a pressure to cause the solid foulant to compress and fuse into particles of at least 1 mm effective diameter at the solids outlet.

13. The method of claim 1, wherein the solid foulant is provided to a melting device that produces a final product comprising a liquid foulant.

14. The method of claim 13, wherein the foulant comprises carbon dioxide and the melting device is operated at a pressure above a pressure at which liquid carbon dioxide can exist.

15. The method of claim 1, wherein the solid foulant is warmed as a portion of a refrigeration process to produce the cryogenic liquid.

16. The method of claim 1, wherein a portion of the cryogenic liquid is entrained in the solid foulant and the cryogenic liquid is removed by a solid-liquid separation process.

17. The method of claim 16, wherein the solid-liquid separation process comprises a screw press, a filter-press, or a combination thereof.

18. The method of claim 1, wherein the permeable exterior wall comprises openings of less than 25 microns.

19. The method of claim 1, wherein any surface of the permeable exterior wall exposed to cryogenic liquid comprises ceramics, polytetrafluoroethylene, polychlorotrifluoroethylene, natural diamond, man-made diamond, chemical-vapor deposition diamond, polycrystalline diamond, or combinations thereof.

20. The method of claim 1, wherein the permeable exterior wall is provided with a means of removing a solid buildup through an opening or openings in the permeable exterior wall, the means comprising a pulse of pressurized gas into the vessel through the opening or openings.

* * * * *